UNITED STATES PATENT OFFICE.

THOMAS A. EDISON, OF LLEWELLYN PARK, ORANGE, NEW JERSEY.

COMPOSITE METAL.

No. 850,881.          Specification of Letters Patent.          Patented April 16, 1907.

Original application filed March 30, 1905, Serial No. 252,933. Divided and this application filed January 20, 1906. Serial No. 296,955.

*To all whom it may concern:*

Be it known that I, THOMAS ALVA EDISON, a citizen of the United States, residing at Llewellyn Park, Orange, in the county of Essex and State of New Jersey, have invented a certain Composite Metal, of which the following is a description.

In an application for Letters Patent filed March 30, 1905, Serial No. 252,933, I have described an improved process for making a composite metal, and I propose herein to describe and claim the new product so secured.

The new composite metal consists of two or more metals physically admixed in such a way that each metal exists as a practically integral sponge-like structure, the cells or pores of either metal being completely filled by the body presented by the other metal, whereby the entire bulk of the composite structure as a whole will be continuously solid throughout. Such a composite metal is characteristically distinguished from any so-called "alloy" heretofore made, so far as I know, in the respect that it consists of sponge-like interlocking masses, so that it becomes possible by dissolving or otherwise removing one of the metals to obtain a sponge-like integral mass of the other metal, whereas with ordinary alloys, owing to their intimate molecular admixture, the attempt to dissolve any one of the constituents of the the alloy results in the disintegration of the mass. This characteristic peculiarity of my improved composite metal makes it possible to secure very beautiful sponge-like effects in various metals by first forming the composite metal and then removing one of the metals, and it also becomes possible to secure attractive effects in many arts where it is desirable that two or more metals should be mechanically associated together.

The primary purpose for which I have used the composite metal referred to is for the production of scales, flakes, or foils of nickel and cobalt for admixture with the active material in the negative electrode of my improved storage battery. As I have pointed out in application for Letters Patent filed March 30, 1905, Serial No. 252,935, good contact with such active material and between the flakes or foils themselves is secured when metallic cobalt is used; but, as I have explained, it is undesirable to use metallic cobalt alone, owing to the fact that its surface becomes oxidized by electrolysis and might in time penetrate the whole mass, and hence it might be advisable to make use of a composite metal of cobalt and nickel. Such a composite metal serves to give excellent contact, and the presence of the nickel therein prevents penetration of oxidation within the nickel-cobalt to a harmful extent, since the metallic nickel forms a continuous integral connecting-sponge, and therefore protects the cobalt from the possibility of inward oxidation to any harmful extent.

Assuming a composite metal of nickel and cobalt to be manufactured for the purpose of forming scales, films, or foils for use in the make-up of my improved battery, I proceed substantially as follows: A solution of sulfate of nickel and sulfate of cobalt is first obtained in the proper relative quantity to give to the resulting product the desired proportions of the two metals. Excellent results have been secured with a composite metal containing sixty per cent. of cobalt and forty per cent. of nickel; but these proportions may be varied within quite wide limits. The solution of cobalt and nickel sulfates is now added to a potash solution in excess of that necessary to precipitate the two salts, and the two solutions thus added are boiled, resulting in the precipitation of hydroxids of nickel and cobalt, which are allowed to settle. The solution is now drawn off and the precipitated mixed hydroxids are washed successively until the mass is free of potash and sulfates. In this way I obtain a physically and intimately mixed mass of hydroxids of the two metals in the desired proportion. The mixed hydroxids are now dried and screened into granules of substantially uniform size—for instance, those passing a thirty-mesh screen and arrested by a sixty-mesh screen—after which the granules are subjected to the reducing action by hydrogen gas in a heated retort to reduce the hydroxids to the respective metals and also to weld together the metallic particles constituting each of the granules, so that each granule will be composed of a combination of the two metals having the characteristics before pointed out. The reduced metallic granules are now subjected to successive rolling operations with oil to convert the composite metal into fine scales or flakes—as is common in the art, for example, of making bronze powder. Preferably the flakes are annealed two or more times between the passes of the rolling operation in an inert gas, such as hydrogen, at a red heat. After the flakes or foils are formed it is desirable in order to increase their bulk to pass them between very fine crimping-rolls, by which they will be crimped, corrugated, or otherwise distorted, or between rolls of very small diameter, by which they will be curled or formed into minute spirals. These flakes or foils are added to the active material of the battery in any suitable way, preferably by coating the active particles with a sticky material, such as molasses, and then admixing the same with the metallic flakes or scales, as I have described in an application for Letters Patent filed March 30, 1905, Serial No. 252,931.

Having now described my invention, what I claim as new, and desire to secure by Letters Patent, is as follows:

1. A composite composed of two or more metals, each in the form of a substantially integral sponge-like structure and said structures being engaged intimately together to constitute a solid mass, substantially as and for the purposes set forth.

2. A composite composed of cobalt and nickel, each in the form of a substantially integral sponge-like structure intimately engaging together to form a continuous solid mass, substantially as and for the purposes set forth.

This specification signed and witnessed this 19th day of January, 1906.

THOS. A. EDISON.

Witnesses:
FRANK L. DYER,
ANNA R. KLEHM